(12) United States Patent
Ueda

(10) Patent No.: US 6,301,069 B1
(45) Date of Patent: Oct. 9, 2001

(54) SERVO CONTROL APPARATUS UTILIZING CLOCK SIGNAL AND CONTROL DATA

(75) Inventor: Eiji Ueda, Kodaira (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/162,860

(22) Filed: Sep. 29, 1998

(30) Foreign Application Priority Data

Oct. 3, 1997 (JP) .................................................. 9-271734

(51) Int. Cl.$^7$ .................................................. G11B 21/04
(52) U.S. Cl. ...................... 360/70; 360/73.12; 360/73.11; 360/73.14; 318/560; 386/80
(58) Field of Search .................................. 360/70, 73, 12, 360/73.11, 73.14; 318/560, 618; 242/334, 334.3, 334.4; 386/78, 79, 80, 81

(56) References Cited

U.S. PATENT DOCUMENTS 5,959,799 * 9/1999 Deoka ................................ 360/73.08

FOREIGN PATENT DOCUMENTS

| 57-6415 | 1/1982 | (JP) . |
| 60-107763 | 6/1985 | (JP) . |

* cited by examiner

*Primary Examiner*—Alan T. Faber
(74) *Attorney, Agent, or Firm*—Ladas & Parry

(57) ABSTRACT

A servo control apparatus controls operation of a to-be-controlled object through execution of software based on control data and reference data. An operation-signal generating portion generates an operation signal having a frequency representing the operation of the to-be-controlled object. A clock-signal generating portion generates a clock signal having a frequency controlled in accordance with the control data. A counting portion measures a time corresponding to the period of the operation-pulse signal by counting pulses of the clock signal, and generates a count value. A controlling portion controls the operation of the to-be-controlled object through execution of software based on the count value and the reference data.

6 Claims, 8 Drawing Sheets

SERVO CONTROL APPARATUS UTILIZING CLOCK SIGNAL AND CONTROL DATA

BACKGROUND OF THE INVENTION

1. Field of the Invention

The present invention relates to a servo control apparatus, and, in particular, to a servo control apparatus which performs servo control of operation of a to-be-controlled object using software.

2. Description of the Related Art

There is a recording-medium reproducing apparatus in which a recording medium such as a magnetic tape is driven and information recorded in the recording medium is read.

Such an apparatus may have a pitch-control function for adjusting an information reading speed as a result of controlling a recording-medium feeding speed. Such an apparatus may perform the pitch control using hardware, specifically, using an analog circuit, or may perform the pitch control using software, specifically, using a microcomputer.

When the pitch control is performed in an analog manner by using discrete circuits, an IC, or an LSI circuit, a clock signal which is changed in accordance with a desired information reading speed is directly provided to such a circuit(s). On the other hand, when the pitch control is performed by using software, a clock of a fixed frequency is connected to a particular microcomputer, a special circuit detects data for the pitch control, and execution of the software is controlled so as to respond to the detected data, and, thus, the pitch control is achieved.

FIG. 1 shows a block diagram of one example of an information storing apparatus in the related art.

The information storage apparatus 100 stores digital sound information in a magnetic tape cassette for 8-mm VTR. The information storage apparatus 100 mainly includes a mechanical portion 101, a servo microcomputer 102, a system microcomputer 103, a signal processing block 104, a clock-signal generating portion 105, an ATF circuit 106, an A-D/D-A converting portion 107, and a key operating portion 108.

In the mechanical portion 101, the tape cassette 110 containing a magnetic tape 109 is loaded, and the magnetic tape 109 is wound on a rotation drum 112 in which magnetic heads 111 are fixed.

The rotation drum 112 is rotated by a drum motor 113. The magnetic tape 109 is sandwiched by a capstan motor 114 and a capstan roller 115, and is caused to run at a predetermined speed as a result of the capstan motor 114 rotating. As a result, the magnetic tape 109 slides on the magnetic head 111 at a relative speed. Thus, a signal is read from tracks, which are formed on the magnetic tape 109 in a manner in which the tracks are inclined with respect to the tape running direction.

The thus-read signal is supplied to the signal processing block 104. The signal processing block 104 demodulates the read signal and outputs the demodulated signal through the A-D/D-A converting portion 107. Further, the signal processing block 104 generates a SERVO ref signal for controlling the rotation phase of the rotation drum 112 and provides the SERVO ref signal to the servo microcomputer 102. The servo microcomputer 102 is connected with the drum motor 113, the capstan motor 114 and so forth, and performs servo control of the rotation of the rotation drum 112 and the running speed of the magnetic tape 109 so that the relative speed between the magnetic head 111 and the magnetic tape 109 is fixed.

A fixed-frequency clock 116 is connected to the servo microcomputer 102, and the servo microcomputer 102 operates using a clock signal provided by the fixed-frequency clock 116. The servo microcomputer 102 performs the servo control through execution of a previously set software.

The system microcomputer 103 is connected to the servo microcomputer 102, and the servo microcomputer 102 performs the servo control in accordance with commands and pitch data provided by the system microcomputer 103. The key operating portion 108 is connected to the system microcomputer 103, and the commands and pitch data are recognized by the system microcomputer 103 in response to key operation in the key operating portion 108, operation of the system microcomputer 103 itself and operation of other external equipment. Then, the system microcomputer 103 provides the thus-recognized commands and pitch data to the servo microcomputer 102 and the clock-signal generating portion 105. The system microcomputer 103 operates using a clock signal provided by a fixed-frequency clock 117.

The clock-signal generating portion 105 has fixed-frequency clocks 118 and 119, generates various clock signals, and provides the clock signals to the signal processing block 104, ATF circuit 106 and A-D/D-A converting portion 107. The ATF circuit 106 operates using the predetermined clock signal generated by the clock-signal generating portion 105, detects an ATF error signal from a reproduced signal, and provides the detected ATF error signal to the servo microcomputer 102.

The servo microcomputer 102 performs the servo control in accordance with the commands and ATF error signal. Also, at the time of pitch-control reproduction, the servo microcomputer 102 performs reproduction at a speed in accordance with the pitch data provided by the system microcomputer 103.

FIG. 2 shows a flowchart of operation of the servo microcomputer 102.

The servo microcomputer 102 is initialized by start of power supply or the like (in a step S6-1). Then, in response to the commands, which are provided by the system microcomputer 103 in response to an operation of a reproduction key in the key operating portion 108, the servo microcomputer 102 starts control of the mechanical portion 101 through drum servo, capstan servo and so forth (in a step S6-2). Thus, the servo microcomputer 102 enters a reproduction condition.

In the reproduction condition, the servo microcomputer 102 performs a drum servo routine (a step S6-3), a capstan servo routine (a step S6-4), and a reel servo routine (a step S6-5) in sequence.

In the drum servo routine (the step S6-3), the capstan servo routine (the step S6-4), and the reel servo routine (the step S6-5), the pitch data which is provided by the system microcomputer 103 in accordance with the pitch data input through a key operation in the key operating portion 108 is processed through execution of software, and the servo control is performed.

In the drum servo routine (the step S6-3), the pitch data is recognized (in steps S6-31, S6-32). In the step S6-31, when the pitch data is 0%, that is, when the reproduction speed is not changed, a drum servo parameter for determining a reference condition for the drum servo control is set to a previously set reference value, and the drum servo control is performed (in steps S6-33, S6-34).

When the pitch data provided by the system microcomputer 103 has a positive value in the step S6-32, that is, when the reproduction speed is increased, the drum servo parameter is set to the value obtained as a result of the absolute value of the pitch data value being added to the previously set reference value, and the drum servo control is performed (in a step S35 and the step S34).

When the pitch data provided by the system microcomputer 103 has a negative value in the step S6-32, that is, when the reproduction speed is decreased, the drum servo parameter is set to the value obtained as a result of the absolute value of the pitch data value being subtracted from the previously set reference value, and the drum servo control is performed (in a step S36 and the step S34).

In the capstan servo routine (the step S6-4), the pitch data is recognized (in steps S6-41, S6-42).

In the step S6-41, when the pitch data is 0%, that is, when the reproduction speed is not changed, a capstan servo parameter for determining a reference condition for the capstan servo control is set to a previously set reference value, and the capstan servo control is performed (in a steps S6-43, S6-44).

When the pitch data provided by the system microcomputer 103 has a positive value in the step S6-42, that is, when the reproduction speed is increased, the capstan servo parameter is set to the value obtained as a result of the absolute value of the pitch data value being added to the previously set reference value, and the capstan servo control is performed (in a step S6-45 and the step S6-44).

When the pitch data provided by the system microcomputer 103 has a negative value in the step S6-42, that is, when the reproduction speed is decreased, the capstan servo parameter is set to the value obtained as a result of the absolute value of the pitch data value being subtracted from the previously set reference value, and the capstan servo control is performed (in a step S6-46 and the step S6-44).

In the reel servo routine (the step S6-5), the pitch data is recognized (in steps S6-51, S6-52).

In the step S6-51, when the pitch data is 0%, that is, when the reproduction speed is not changed, a reel servo parameter for determining a reference condition for reel servo control is set to a previously set reference value, and the reel servo control is performed (in steps S6-53, S6-54).

When the pitch data provided by the system microcomputer 103 has a positive value in a step S6-52, that is, when the reproduction speed is increased, the reel servo parameter is set to the value obtained as a result of the absolute value of the pitch data value being added to the previously set reference value, and the reel servo control is performed (in a step S6-55 and the step S6-54).

When the pitch data provided by the system microcomputer 103 has a negative value in the step S6-52, that is, when the reproduction speed is decreased, the reel servo parameter is set to the value obtained as a result of the absolute value of the pitch data value being subtracted from the previously set reference value, and the reel servo control is performed (in a step S6-56 and the step S6-54).

Thus, in each of the drum servo routine (the step S6-3), the capstan servo routine (the step S6-4) and the reel servo routine (the step S6-5), a process for causing the servo parameter to reflect the pitch data, input through key operation in the key operating portion 108, is executed through execution of software.

Thus, in the servo microcomputer 102, the pitch control operation in accordance with the input pitch data is performed through the execution of the software. Therefore, because the steps for processing of the pitch data should be executed, a response of the pitch control in response to the input of the pitch data is slow, and operation performance of the pitch control is not good.

Further, because the servo microcomputer 102 performs the servo control based on the pitch data, the software is complicated. Furthermore, since the control operation is started after the pitch data is detected, a time lag occurs, and it is difficult for the pitch data to be smoothly followed.

SUMMARY OF THE INVENTION

The present invention is directed to eliminating the above-mentioned problems, and an object of the present invention is to provide a servo control apparatus in which it is possible to smoothly perform servo control of a to-be-controlled object (each motor) in accordance with control data (pitch data).

A servo control apparatus, according to the present invention, which controls operation of a to-be-controlled object through execution of software based on control data and reference data, comprises:

an operation-signal generating portion generating an operation signal having a frequency representing the operation of the to-be-controlled object;

a clock-signal generating portion generating a clock signal having a frequency controlled in accordance with the control data;

a counting portion measuring a time corresponding to the period of the operation signal by counting pulses of the clock signal, and generating a count value; and a controlling portion controlling the operation of the to-be-controlled object through execution of software based on the count value and the reference data.

In this arrangement, because the operation of the to-be-controlled object can be controlled as a result of the frequency of the clock signal being controlled in accordance with the control data, the control portion does not need to process the control data through execution of software. Thereby, it is possible to simplify a process to be executed by the control portion, and to perform control of the operation of the to-be-controlled object smoothly.

The servo control apparatus may further comprise a control-data updating portion inserting control data between current control data and new control data, and updating the control data to be provided to the clock-signal generating portion, from the current control data, to the thus-inserted control data, and then, to the new control data, the thus-inserted control data being determined to have a value such that the control data to be provided to the clock-signal generating portion changes gradually.

In this arrangement, the control data is inserted between the current control data and the new control data, the thus-inserted control data being determined to have a value such that the control data to be provided to the clock-signal generating portion changes gradually. Thereby, when the new control data is so different from the current control data that the frequency of the clock signal should be changed significantly, because the frequency of the clock signal changes gradually in response to the gradual change in the control data, control of the to-be-controlled object can be performed smoothly.

An information storing apparatus, according to another aspect of the present invention, comprises:

a mechanism portion driving a storing medium;

a detecting portion detecting a driving state of the mechanism portion and generating a monitor signal having a frequency representing the driving state of the mechanism portion;

a servo control portion measuring a time corresponding to the period of the monitor signal by counting pulses of a predetermined clock signal, and controlling the mechanism portion in accordance with the result of the measurement so as to cause the driving state of the mechanism portion to become a predetermined state; and a clock-signal generating portion generating a clock signal having a frequency controlled in accordance with control data, and providing the clock signal as the predetermined clock signal to the servo control portion.

In this arrangement, because the driving state of the mechanism portion can be controlled as a result of the clock signal having the frequency controlled in accordance with the control data being generated by the clock-signal generating portion and being provided to the servo control portion as the predetermined clock signal, the servo control portion does not need to process the control data through execution of software. Thereby, it is possible to simplify a process to be executed by the servo control portion, and to perform control of the driving state of the mechanism portion smoothly.

The information storing apparatus may further comprise a control-data updating portion inserting control data between current control data and new control data, and updating the control data to be provided to the clock-signal generating portion, from the current control data, to the thus-inserted control data, and then, to the new control data, the thus-inserted control data being determined to have a value such that the control data to be provided to the clock-signal generating portion changes gradually.

In this arrangement, the control data is inserted between the current control data and the new control data, the thus-inserted control data being determined to have a value such that the control data to be provided to the clock-signal generating portion changes gradually. Thereby, when the new control data is so different from the current control data that the frequency of the clock signal should be changed significantly, because the frequency of the clock signal changes gradually in response to the gradual change in the control data, the driving state of the mechanism portion can be changed smoothly. As a result, a condition in which the servo control of the mechanism portion cannot be continued due to sudden change in the frequency of the clock signal can be prevented from occurring.

Other objects and further features of the present invention will become more apparent from the following detailed descriptions when read in conjunction with the accompanying drawings.

DETAILED DESCRIPTION OF THE PREFERRED EMBODIMENT

Figure 1:
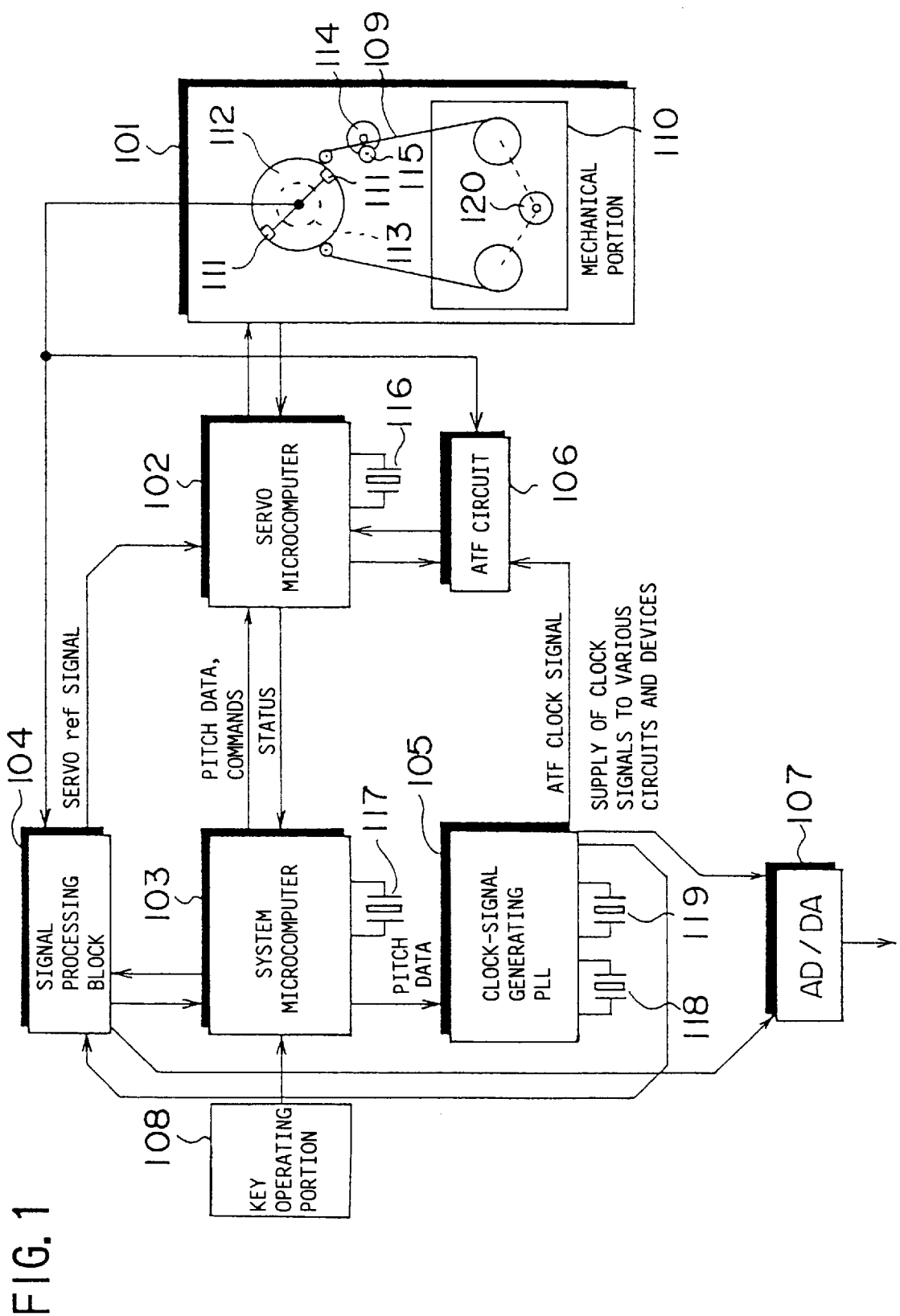
FIG. 1 shows a block diagram of one example of an information storing apparatus in the related art.
Figure 2:
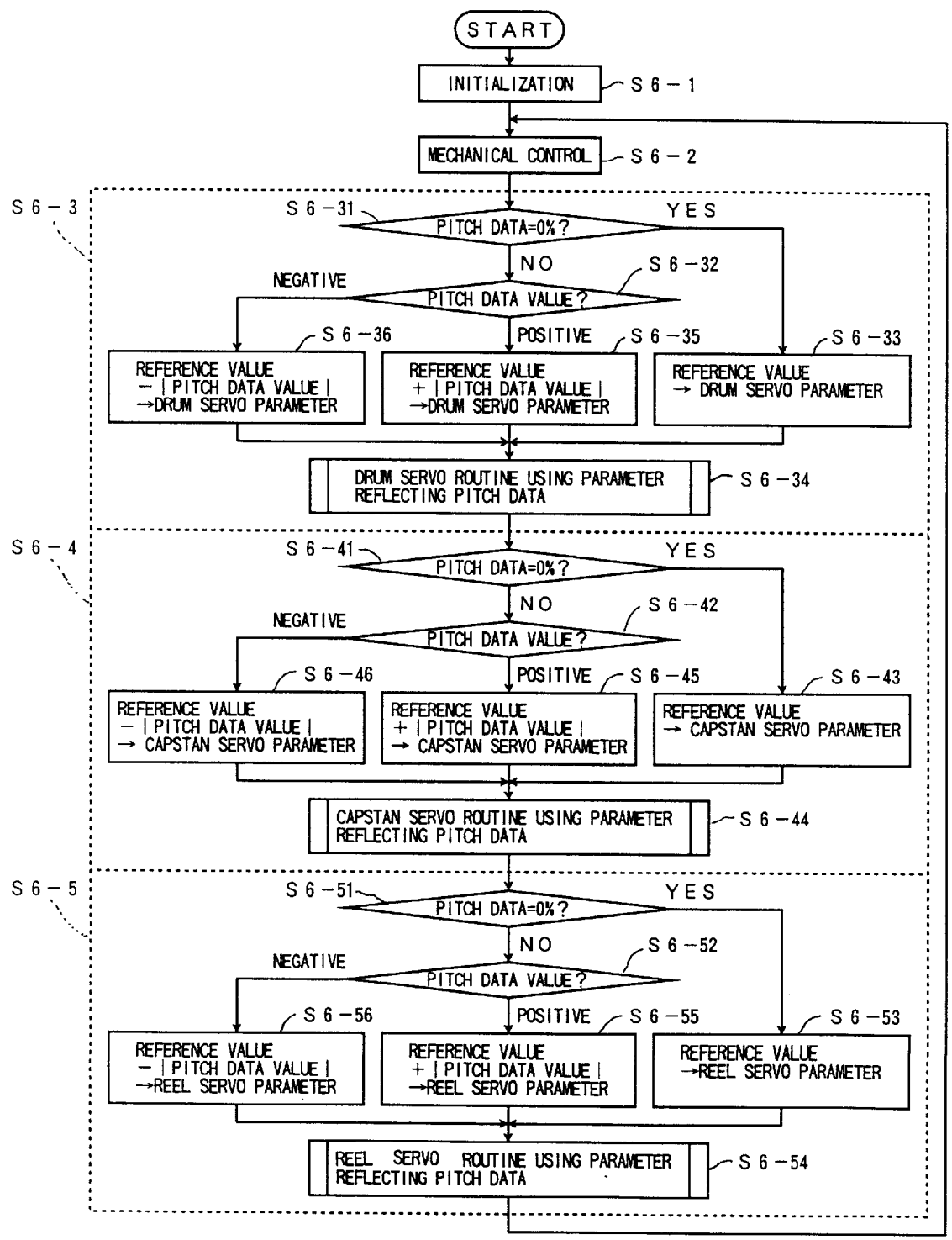
FIG. 2 shows an operation flowchart of a servo microcomputer shown in FIG. 1.
Figure 3:
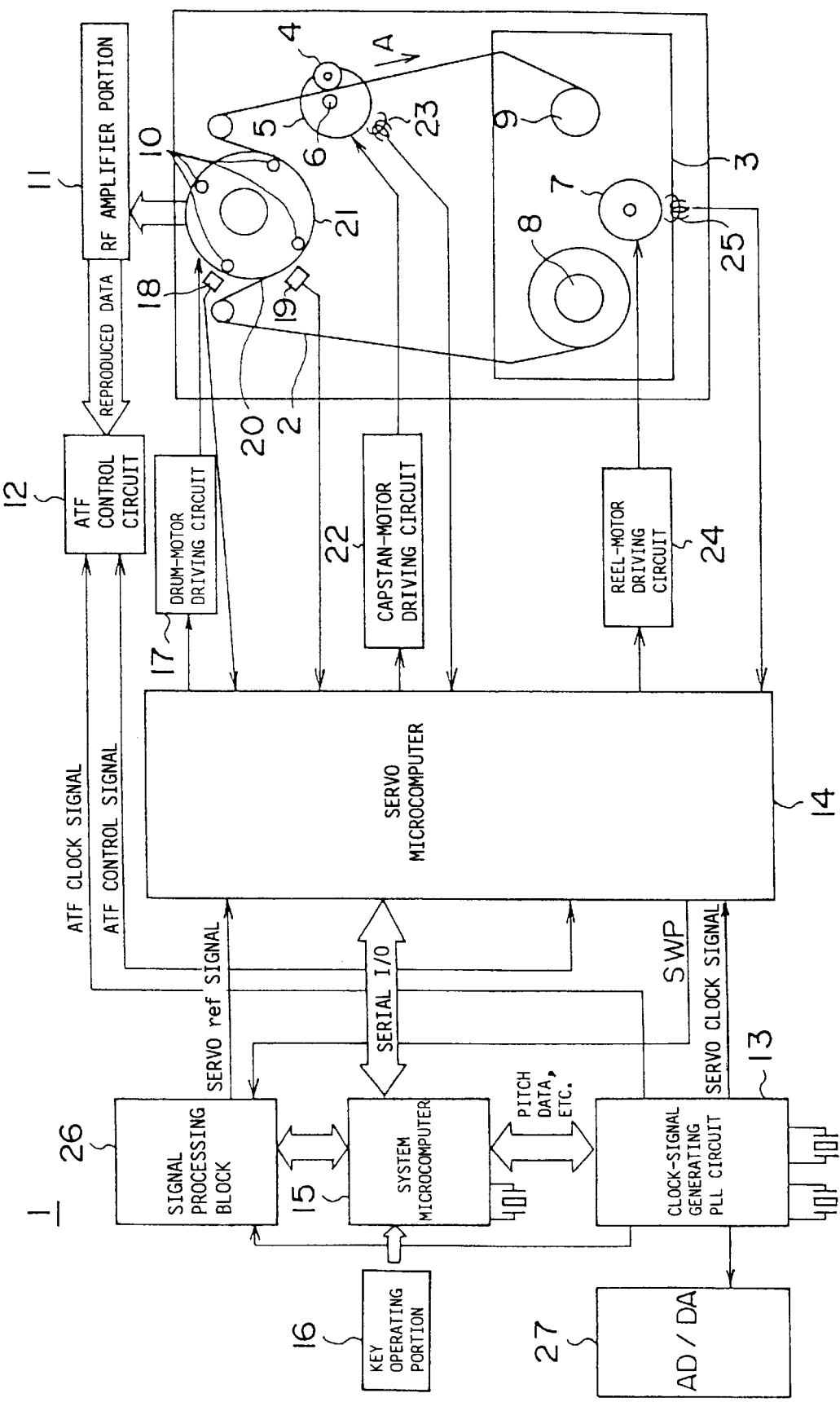
FIG. 3 shows a block diagram of one embodiment of the present invention.

FIG. 3 shows a block diagram of one embodiment of the present invention.

This embodiment is a tape recorder as an information storing apparatus. The tape recorder 1 in the embodiment performs recording/reproducing of sound, using the format of an 8-mm VTR tape cassette, in/from the 8-mm VTR tape cassette.

A tape cassette 3 containing a magnetic tape 2 is loaded in the tape recorder 1. The magnetic tape 2 is drawn out from the tape cassette 3, is sandwiched by a capstan roller 4 and a rotating shaft 6 of a capstan motor 5, and is moved at a fixed speed in a direction of an arrow A by the rotation of the capstan motor 5.

A reel motor 7 rotates reels 8 and 9, applies a predetermined tension to the magnetic tape 2, and winds the magnetic tape 2 onto the winding reel 9.

Magnetic heads 10 are connected to an RF amplifier portion 11. The RF amplifier portion 11 amplifies a reproduced signal detected through the magnetic heads 10. The reproduced signal amplified by the RF amplifier portion 11 is provided to an ATF (Automatic Track Following) control circuit 12.

An ATF clock signal is provided to the ATF control circuit 12 by a clock-signal generating PLL circuit 13. The ATF control circuit 12 generates an ATF control signal from the reproduced signal. The ATF control signal is provided to a servo microcomputer 14. The servo microcomputer 14 performs ATF control in accordance with the ATF control signal.

A system microcomputer 15 is connected with a key operating portion 16, generates pitch data in accordance with a key operation in the key operating portion 16, and provides the pitch data to the clock-signal generating PLL circuit 13. Further, the system microcomputer 15 sends commands to the servo microcomputer 14 in response to rewind and fast-forward key operations in the key operating portion 16.

A drum-motor driving circuit 17 is connected with the servo microcomputer 14. The servo microcomputer 14 generates a control voltage for controlling the rotation of a drum motor 21 in accordance with the rotation speed and the rotation phase of a rotation drum 20 detected by a drum FG sensor 18 and a drum PG sensor 19, and provides the control voltage to the drum-motor driving circuit 17. Further, a capstan-motor driving circuit 22 is connected with the servo microcomputer 14. The servo microcomputer 14 generates a control voltage for controlling the rotation of the capstan motor 5 in accordance with the rotation speed of the capstan motor 5 detected by a capstan FG sensor 23, and provides the control voltage to the capstan-motor driving circuit 22.

Further, a reel-motor driving circuit 24 is connected with the servo microcomputer 14. The servo microcomputer 14 generates a control voltage for controlling the rotation of the reel motor 7 in accordance with the rotation speed of the reel motor 7 detected by a reel FG sensor 25, and provides the control voltage to the reel-motor driving circuit 24.

The clock-signal generating PLL circuit 13 has two crystal oscillators, and generates a master clock signal, for processing an audio signal, to be provided to a signal processing block 26 and an A-D/D-A converting circuit 27, and a master clock signal, for servo control, to be provided to the servo microcomputer 14. The pitch data generated in accordance with the key operation in the key operating portion 16 is provided to the clock-signal generating PLL circuit 13 from the system microcomputer 15, and the frequency of the master clock signal for the servo control is changed in accordance with the pitch data.

Figure 4:
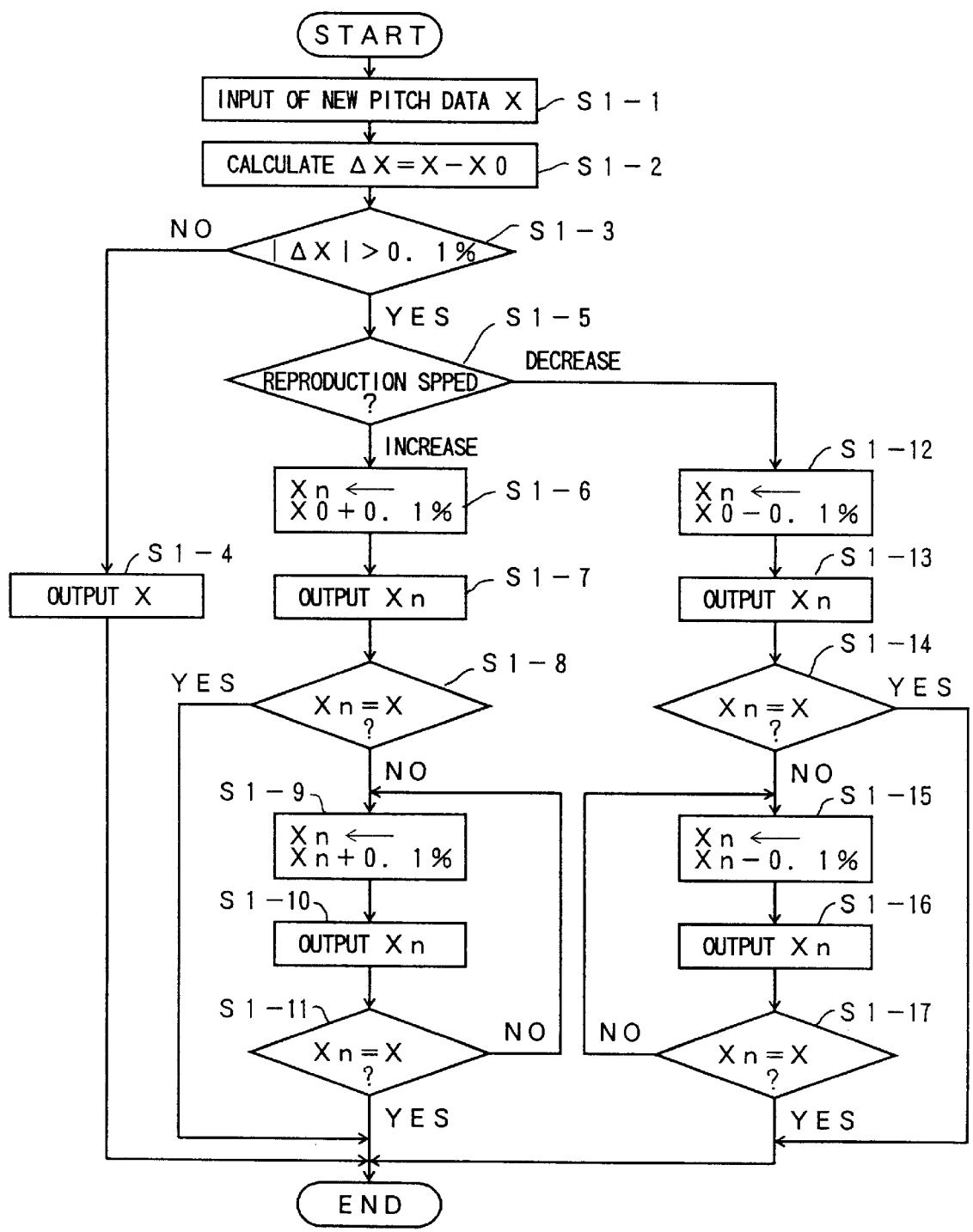
FIG. 4 shows an operation flowchart of a system microcomputer shown in FIG. 3.

FIG. 4 shows a flowchart of operation of the system microcomputer 15.

The system microcomputer 15 holds the current pitch data (X0) inside, and, when the new pitch data (X) is input through the key operation in the key operating portion 16 (in a step S1-1), calculates the differnce $\Delta X$ (=X−X0) between the new pitch data and the current pitch data (in a step S1-2).

Then the absolute value $|\Delta X0|$ of the pitch-data difference $\Delta X0$ is compared with 0.1% of the standard reproduction speed (in a step S1-3).

When the absolute value $|\Delta X0|$ of the pitch-data difference is equal to or smaller than 0.1% of the standard reproduction speed as a result of the comparison in the step S1-3, the new pitch data X itself is provided to the clock-signal generating PLL circuit 13 (in a step S1-4).

When the absolute value $|\Delta X0|$ of the pitch-data difference is larger than 0.1% of the standard reproduction speed as a result of the comparison in the step S1-3, it is determined, as a result of a determination being made as to whether the pitch data difference $\Delta X0$ has a positive value or a negative value, whether the reproduction speed is increased ($\Delta X0>0$) or decreased ($\Delta X<0$) (in a step S1-5).

When it is determined in the step S1-5 that the reproduction speed is increased, the pitch data Xn, which is obtained as a result of 0.1% of the standard reproduction speed being added to the current pitch data X0, is calculated (in a step S1-6), and the pitch data Xn is provided to the clock-signal generating PLL circuit 13 (in a step S1-7).

Then, the pitch data Xn is compared with the input pitch data X (in a step S1-8), 0.1% of the standard reproduction speed is added to the pitch data Xn successively until the pitch data Xn becomes equal to the input pitch data X, and the pitch data Xn is provided to the clock-signal generating PLL circuit 13 after each addition operation (in steps S1-9 through S1-11).

Thereby, the reproduction speed increases gradually 0.1% of the standard reproduction speed at a time, until the current pitch data X0 becomes equal to the input pitch data X.

When it is determined in the step S1-5 that the reproduction speed is decreased, the pitch data Xn, which is obtained as a result of 0.1% of the standard reproduction speed being subtracted from the current pitch data X0, is calculated (in a step S1-12), and the pitch data Xn is provided to the clock-signal generating PLL circuit 13 (in a step S1-13).

Then, the pitch data Xn is compared with the input pitch data X (in a step S1-14), 0.1% of the standard reproduction speed is subtracted from the pitch data Xn successively until the pitch data Xn becomes equal to the input pitch data X, and the pitch data Xn is provided to the clock-signal generating PLL circuit 13 after each subtraction operation (in steps S1-15 through S1-17).

Thereby, the reproduction speed decreases gradually 0.1% of the standard reproduction speed at a time, until the current pitch data X0 becomes the input pitch data X.

The pitch data thus generated in the system microcomputer 15 is provided to the clock-signal generating PLL circuit 13. In the clock-signal generating PLL circuit 13, the servo clock signal and so forth are controlled in accordance with the pitch data, and the servo clock signal is provided to the servo microcomputer 14.

In the servo microcomputer 14, servo routines are controlled in accordance with the clock signal provided by the clock-signal generating PLL circuit 13.

Figure 5:
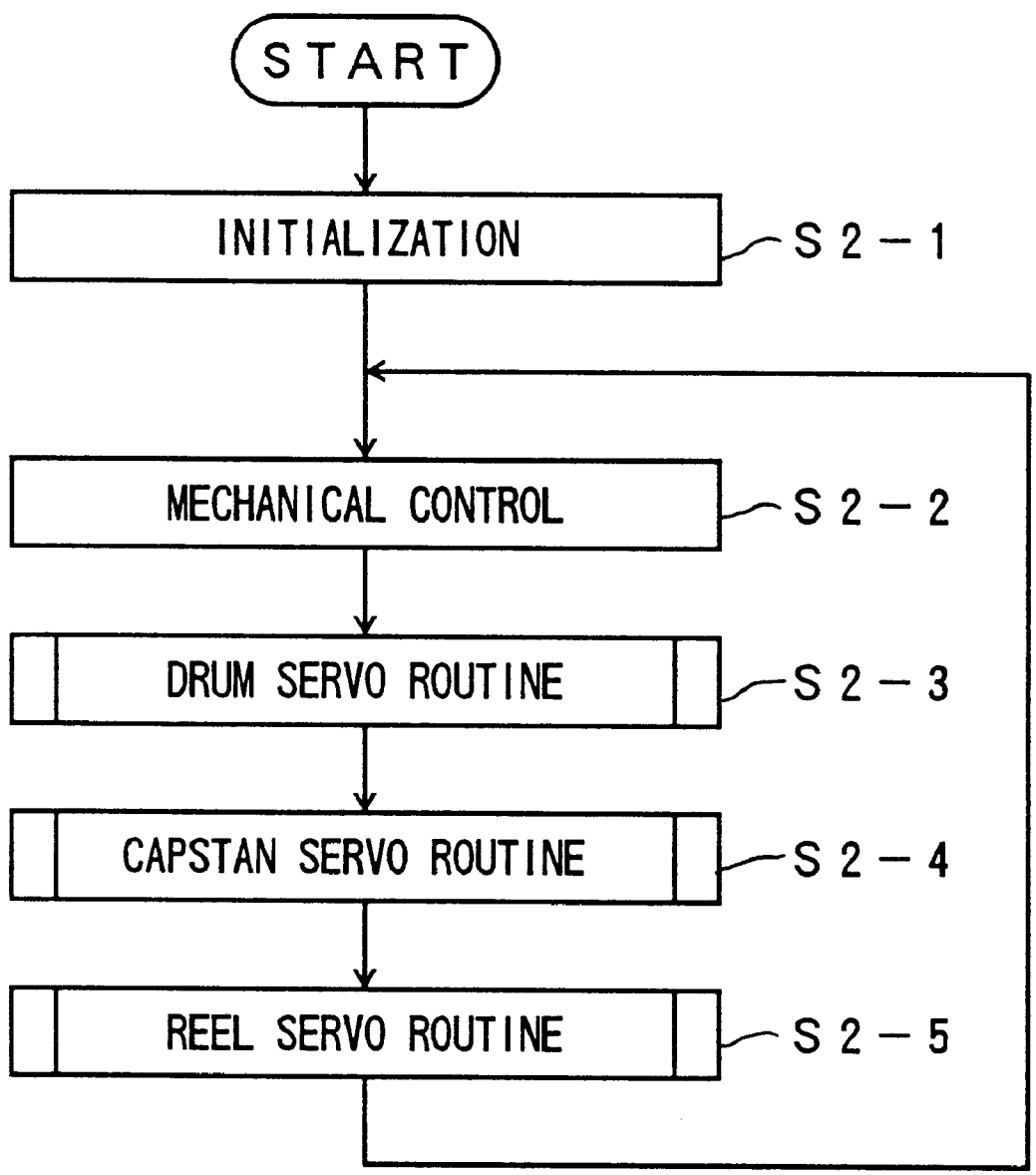
FIG. 5 shows an operation flowchart of a servo microcomputer shown in FIG. 3.

FIG. 5 shows a flowchart of operation of the servo microcomputer 14.

At the time of start of power supply or the like, the internal state of the servo microcomputer 14 is initialized (in a step S2-1). After the initialization, when the tape cassette 3 is inserted into the tape recorder 1, a series of mechanical control operations such as loading of the cassette 3 in a mechanical portion, tape loading on the drum 20 and so forth are performed in a step S2-2.

Then, when a key operation for performing reproduction is performed in the key operating portion 16, the information of the key operation is input to the system microcomputer 15. As a result, the system microcomputer 15 provides a command for performing reproduction to the servo microcomputer 14. First, the servo microcomputer 14 provides a drum control voltage to the drum-motor driving circuit 17, causes the rotation drum motor 21 to rotate, and performs drum servo control (in a step S2-3).

At the same time, the servo microcomputer 14 provides a capstan control voltage to the capstan-motor driving circuit 22, causes the capstan motor 5 to rotate, performs capstan servo control, and cause the magnetic tape 2 to run (in a step S2-4).

At the same time, the servo microcomputer 14 provides a reel control voltage to the reel-motor driving circuit 24, causes the reel motor 7 to drive, performs reel servo control, causes a tension to be applied to the magnetic tape 2, and causes the magnetic tape 2 to be wound on to the winding reel 9 (in a step S2-5).

Figure 6:
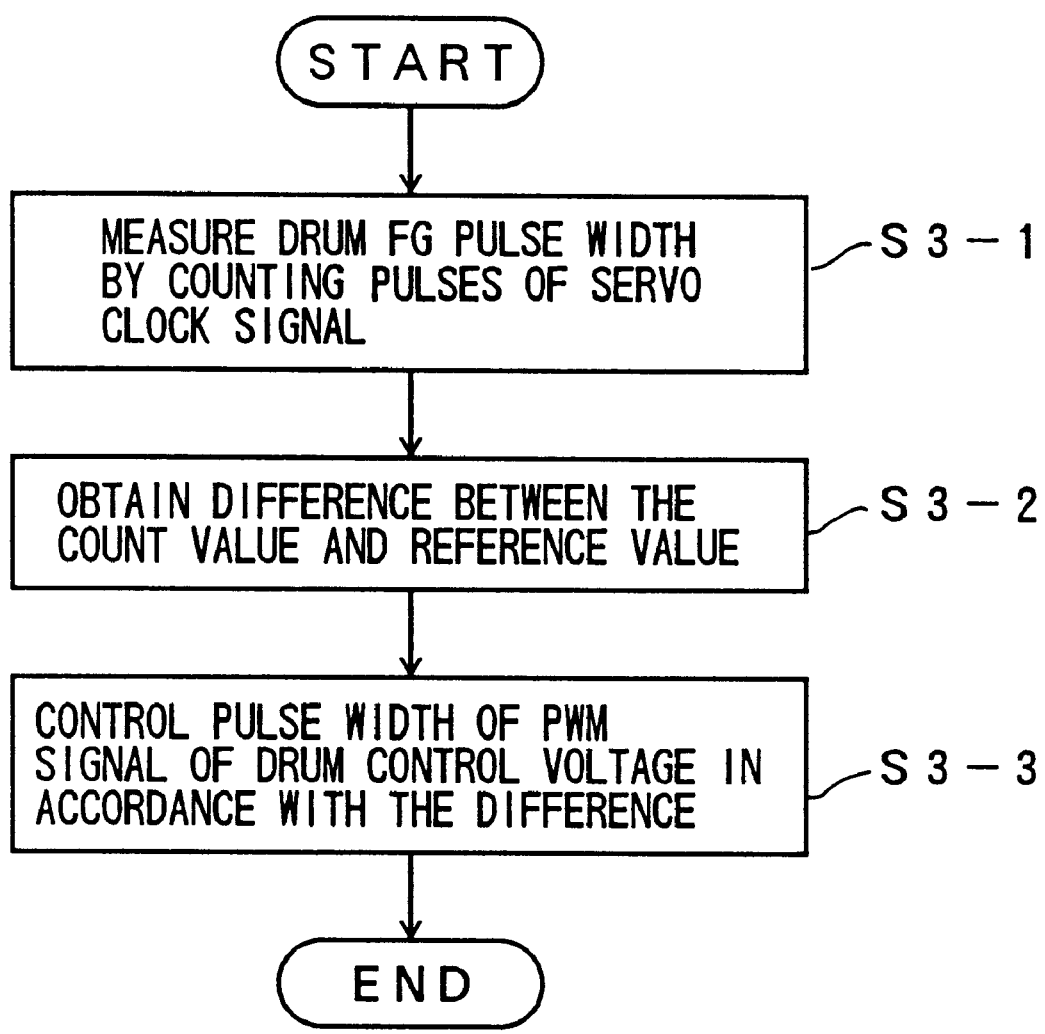
FIG. 6 shows an operation flowchart of a drum servo routine shown in FIG. 5.

FIG. 6 shows an operation flowchart of the above-mentioned drum servo routine (the step S2-3).

In the drum servo routine (the step S2-3), the pulse width (that is, half the period) of a drum FG pulse signal, generated by the drum FG sensor 18 and having the frequency proportional to the rotation speed of the rotation drum 20, is measured as a result of the pulses of the servo clock signal being counted (in a step S3-1).

The count value obtained in the step S3-1 is compared with a previously set drum servo reference value which corresponds to the count value in the case of ordinary reproduction, for example, and the result of subtraction of the drum servo reference value from the count value is obtained (in a step S3-2).

In accordance with the difference obtained in the step S3-2, the servo control is performed, the drum control voltage is calculated, the value of the drum control voltage is converted into a PWM pulse signal and the PWM pulse signal is provided to the drum-motor driving circuit 17 (in a step S3-3).

For example, when a key operation for decreasing the reproduction speed is performed in the key operation portion 16, and, thereby, the pitch data for decreasing the reproduction speed is provided to the clock-signal generating PLL circuit 13 from the system microcomputer 15, the clock-signal generating PLL circuit 13 causes the period of the servo clock signal to be longer (that is, the frequency of the servo clock signal to be lower) than that of the ordinary case. When the period of the servo clock signal becomes longer, the above-mentioned count value becomes smaller than that of the case of the ordinary reproduction. As a result, the result of the subtraction of the drum servo reference value from the count value becomes negative. When the result of the subtraction becomes negative, the servo microcomputer 14 causes the active duty width of the PWM pulse signal of the drum control voltage, to be provided to the drum-motor driving circuit 17, to be smaller than a reference active duty width. When the PWM pulse signal of the driving control voltage having the active duty width smaller than the reference active duty width is provided to the drum-motor driving circuit 17, the drum-motor driving circuit 17 provides a driving signal for causing the rotation speed of the drum motor 21 to be lower than a reference value, to the drum motor 21.

When the pitch data for increasing the reproduction speed is provided to the clock-signal generating PLL circuit 13 from the system microcomputer 15, the clock-signal generating PLL circuit 13 causes the period of the servo clock signal to be shorter (that is, the frequency of the servo clock signal to be higher) than that of the ordinary case. When the period of the servo clock signal becomes shorter, the above-mentioned count value is larger than that of the case of the ordinary reproduction. As a result, the result of the subtraction of the drum servo reference value from the count value becomes positive. When the result of the subtraction becomes positive, the servo microcomputer 14 causes the active duty width of the PWM pulse signal of the drum control voltage, to be provided to the drum-motor driving circuit 17, to be larger than the reference active duty width. When the PWM pulse signal of the driving control voltage having the active duty width larger than the reference active duty width is provided to the drum-motor driving circuit 17, the drum-motor driving circuit 17 provides the driving signal for causing the rotation speed of the drum motor 21 to be higher than the reference value, to the drum motor 21.

Figure 7:
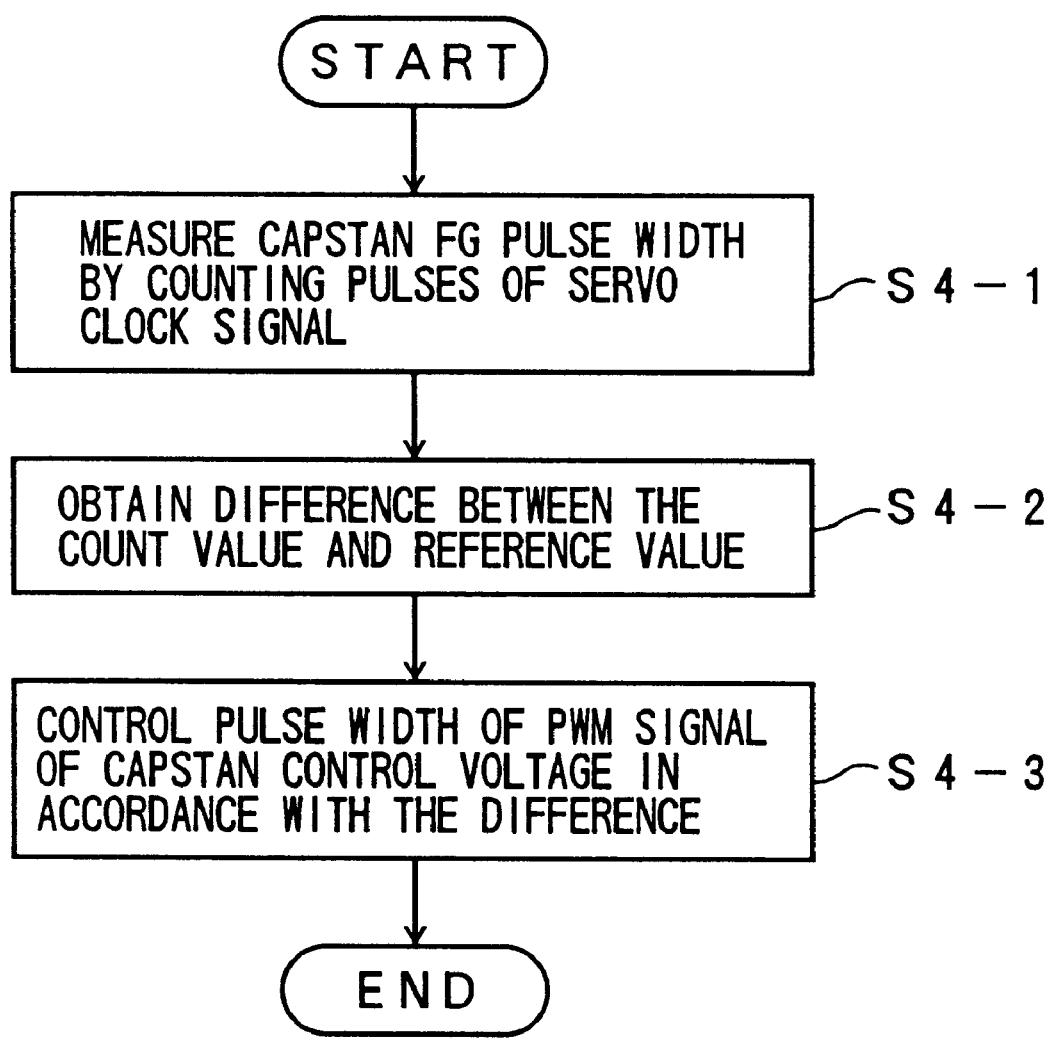
FIG. 7 shows an operation flowchart of a capstan servo routine shown in FIG. 5.

FIG. 7 shows an operation flowchart of the above-mentioned capstan servo routine (the step S2-4).

In the capstan servo routine (the step S2-4), the pulse width (that is, half the period) of a capstan FG pulse signal, generated by the capstan FG sensor 23 and having the frequency proportional to the rotation speed of the capstan motor 5, is measured as a result of the pulses of the servo clock signal being counted (in a step S4-1).

The count value obtained in the step S4-1 is compared with a previously set capstan servo reference value which corresponds to the count value in the case of ordinary reproduction, for example, and the result of subtraction of the capstan servo reference value from the count value is obtained (in a step S4-2).

In accordance with the result of the subtraction obtained in the step S4-2, the servo control is performed, the capstan control voltage is calculated, the value of the capstan control voltage is converted into a PWM pulse signal and the PWM pulse signal is provided to the capstan-motor driving circuit 22 (in a step S4-3).

For example, when the key operation for decreasing the reproduction speed is performed in the key operation portion 16, and, thereby, the pitch data for decreasing the reproduction speed is provided to the clock-signal generating PLL circuit 13 from the system microcomputer 15, the clock-signal generating PLL circuit 13 causes the period of the servo clock signal to be longer (that is, the frequency of the servo clock signal to be lower) than that of the ordinary case. When the period of the servo clock signal becomes longer, the above-mentioned count value becomes smaller than that of the case of the ordinary reproduction. As a result, the result of subtraction of the capstan servo reference value becomes negative. When the result of the subtraction becomes negative, the servo microcomputer 14 causes the active duty width of the PWM pulse signal of the capstan control voltage, to be provided to the capstan-motor driving circuit 22, to be smaller than a reference active duty width. When the PWM pulse signal of the driving control voltage having the active duty width smaller than the reference active duty width is provided to the capstan-motor driving circuit 22, the capstan-motor driving circuit 22 provides a driving signal for causing the rotation speed of the capstan motor 5 to be lower than a reference value, to the capstan motor 5.

When the pitch data for increasing the reproduction speed is provided to the clock-signal generating PLL circuit 13 from the system microcomputer 15, the clock-signal generating PLL circuit 13 causes the period of the servo clock signal to be shorter (that is, the frequency of the servo clock signal to be higher) than that of the ordinary case. When the period of the servo clock signal becomes shorter, the above-mentioned count value becomes larger than that of the case of the ordinary reproduction. As a result, the result of subtraction of the capstan servo reference value from the count value becomes positive. When the result of the subtraction becomes positive, the servo microcomputer 14 causes the active duty width of the PWM pulse signal of the capstan control voltage, to be provided to the capstan-motor driving circuit 22, to be larger than the reference active duty width. When the PWM pulse signal of the driving control voltage having the active duty width larger than the reference active duty width is provided to the capstan-motor driving circuit 22, the capstan-motor driving circuit 22 provides the driving signal for causing the rotation speed of the capstan motor 5 to be higher than the reference value, to the capstan motor 5.

Figure 8:
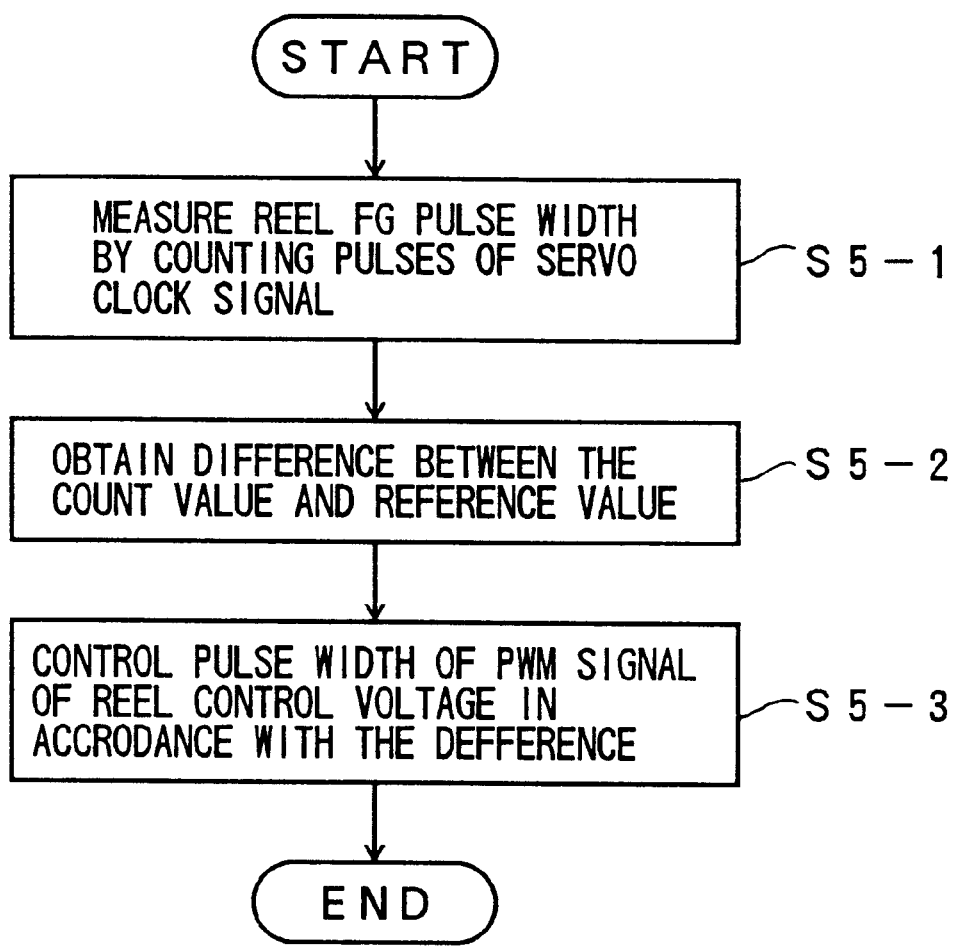
FIG. 8 shows an operation flowchart of a reel servo routine shown in FIG. 5.

FIG. 8 shows an operation flowchart of the above-mentioned reel servo routine (the step S2-5).

In the reel servo routine (the step S2-5), the pulse width (that is, half the period) of a reel FG pulse signal, generated by the reel FG sensor 25 and having the frequency proportional to the rotation speed of the reel motor 7, is measured as a result of the pulses of the servo clock signal being counted (in a step S5-1).

The count value obtained in the step S5-1 is compared with a previously set reel servo reference value which corresponds to the count value in the case of ordinary reproduction, for example, and the result of subtraction of the reel servo reference value from the count value is obtained (in a step S5-2).

In accordance with the result of the subtraction obtained in the step S5-2, the servo control is performed, the reel control voltage is calculated, the value of the reel control voltage is converted into a PWM pulse signal and the PWM pulse signal is provided to the reel-motor driving circuit 24 (in a step S5-3).

For example, when the key operation for decreasing the reproduction speed is performed in the key operation portion 16, and, thereby, the pitch data for decreasing the reproduction speed is provided to the clock-signal generating PLL circuit 13 from the system microcomputer 15, the clock-signal generating PLL circuit 13 causes the period of the servo clock signal to be longer (that is, the frequency of the servo clock signal to be lower) than that of the ordinary case. When the period of the servo clock signal becomes longer, the above-mentioned count value becomes smaller than that of the case of the ordinary reproduction. As a result, the result of subtraction of the reference value becomes negative. When the result of the subtraction becomes negative, the servo microcomputer 14 causes the active duty width of the PWM pulse signal of the reel control voltage, to be provided to the reel-motor driving circuit 24, to be smaller than a reference active duty width. When the PWM pulse signal of the driving control voltage having the active duty width smaller than the reference active duty width is provided to the reel-motor driving circuit 24, the reel-motor driving circuit 24 provides a driving signal for causing the rotation speed of the reel motor 7 to be lower than a reference value, to the reel motor 7.

When the pitch data for increasing the reproduction speed is provided to the clock-signal generating PLL circuit 13 from the system microcomputer 15, the clock-signal generating PLL circuit 13 causes the period of the servo clock signal to be shorter (that is, the frequency of the servo clock signal to be higher) than that of the ordinary case. When the period of the servo clock signal becomes shorter, the above-mentioned count value becomes larger than that of the case of the ordinary reproduction. As a result, the result of subtraction of the reel servo reference value from the count value becomes positive. When the result of the subtraction becomes positive, the servo microcomputer 14 causes the active duty width of the PWM pulse signal of the reel control voltage, to be provided to the reel-motor driving circuit 24, to be larger than the reference active duty width. When the PWM pulse signal of the driving control voltage having. the active duty width larger than the reference active duty width is provided to the reel-motor driving circuit 24, the reel-motor driving circuit 24 provides the driving signal for causing the rotation speed of the reel motor 7 to be higher than the reference value, to the reel motor 7.

At this time, the rotation of the rotation drum 20 and the running of the magnetic tape 2 are controlled by the drum servo routine and the capstan servo routine, respectively, in accordance with the pitch data. This control is performed such that the relative speed between the magnetic heads 11 and the magnetic tape 2 is made to be approximately the same as that in the case of the ordinary reproduction. Information is read from the magnetic tape 2 and reproduced, at the speed which is controlled in accordance with the pitch data.

Thus, as a result of generating the servo clock signal having the period (frequency) which is controlled in accordance with the pitch data, and providing the servo clock signal to the servo microcomputer 14, it is not necessary that the servo microcomputer 14 changes the servo parameters in the drum servo routine, the capstan servo routine and the reel servo routine so as to cause the servo parameters to reflect the pitch data. Thereby, it is possible to simplify the process performed by the servo microcomputer 14. Further, because it is not necessary to store the servo parameters changed in accordance with the pitch data, it is possible to reduce an amount of information to be stored in an internal ROM to be used, and it is possible to further store a program or the like in the internal ROM.

In particular, the servo microcomputer 14 is not conscious of change in the reproduction speed, and the pitch control is performed smoothly in accordance with the input servo clock signal.

Thus, in this embodiment, the period (frequency) of the servo clock signal is controlled in accordance with the pitch data. However, in addition to the control of the period (frequency) of the servo clock signal, by controlling the period (frequency) of the clock signal for processing the audio signal and the period (frequency) of a channel clock signal in accordance with the pitch data, it is not necessary to perform adjustment of circuits, which should be adjusted in accordance with the pitch data, by execution of software based on the pitch data.

In this embodiment, as a result of the servo clock signal having the period (frequency) controlled in accordance with the pitch data being previously generated by the clock-signal generating PLL circuit 13, the count values of the pulses of the servo clock signal in the servo microcomputer 14 change in accordance with the pitch data without changing the servo parameters. Accordingly, similar to the related art, the PWM pulse signal having the active duty width controlled in accordance with the pitch data is provided to each motor driving circuit.

Thus, it is not necessary to perform the change in the servo parameters in accordance with the pitch data, which change is performed in the related art.

In this embodiment, because the servo clock signal generated by the clock-signal generating PLL circuit 13 is directly input to the servo microcomputer 14, it is not necessary to provide the fixed-frequency clock to the servo microcomputer 14. Further, because the period (frequency) of the servo clock signal itself is changed in accordance with the pitch data, the pitch control can be performed without provision of software for the pitch control in the servo microcomputer 14. Further, because the servo clock signal having the period (frequency) controlled in accordance with the pitch data is directly input to the servo microcomputer 14, a time lag due to an operation for detecting the pitch data does not occur, and the key operation can be smoothly and quickly followed.

Further, the present invention is not limited to the above-described embodiment, and variations and modifications may be made without departing from the scope of the present invention.

What is claimed is:

1. A servo control apparatus, which controls operation of a to-be-controlled object through execution of software based on control data and reference data, said apparatus comprising:
    an operation-signal generating portion generating an operation signal having a frequency representing the sensed/detected operation of said to-be-controlled object;
    a clock-signal generating portion generating a clock signal having a frequency controlled in accordance with the control data;
    a counting portion measuring a time corresponding to the period of the operation signal by counting pulses of the clock signal, and generating a count value; and
    a controlling portion controlling the operation of said to-be-controlled object through execution of software based on the count value and the reference data.

2. The servo control apparatus as claimed in claim 1, further comprising a control-data updating portion inserting control data between current control data and new control data, and updating the control data to be provided to said clock-signal generating portion, from the current control data, to the thus-inserted control data, and to the new control data, the thus-inserted control data being determined to have a value such that the control data to be provided to said clock-signal generating portion changes gradually.

3. The servo control apparatus as claimed in claim 1, wherein the control data represents a desired operation condition.

4. An information storing apparatus comprising:
    a mechanism portion driving a storing medium;
    a detecting portion detecting a driving state of said mechanism portion and generating a monitor signal having a frequency representing the driving state of said mechanism portion;
    a servo control portion measuring a time corresponding to the period of the monitor signal by counting pulses of a predetermined clock signal, and controlling said mechanism portion in accordance with the result of the measurement so as to cause the driving state of said mechanism portion to become a predetermined state; and a clock-signal generating portion generating a clock signal having a frequency controlled in accordance with control data, and providing the clock signal as the predetermined clock signal to said servo. control portion.

5. The information storing apparatus as claimed in claim 4, further comprising a control-data updating portion inserting control data between current control data and new control data, and updating the control data to be provided to said clock-signal generating portion, from the current control data, to the thus-inserted control data, and then, to the new control data, the thus-inserted control data being determined to have a value such that the control data to be provided to said clock-signal generating portion changes gradually.

6. The information storage apparatus as claimed in claim 4, wherein the control data represents a desired condition.

* * * * *